2,826,486

PHOSPHIDE COMPOSITIONS

Ludwig Hüter, Frankfurt am Main, Germany, assignor to Deutsche Gold- und Silber-Scheideanstalt vormals Roessler, Frankfurt am Main, Germany No Drawing. Application June 16, 1953
Serial No. 362,157

Claims priority, application Germany July 2, 1952

7 Claims. (Cl. 71—29)

The present invention relates to improved compositions containing metal phosphides which decompose in the presence of water to form hydrogen phosphide and more particularly to such compositions in which the spontaneous combustibility of the metal phosphides and eventually hydrogen phosphides evolved therefrom is suppressed.

It is already known that the phosphides of the alkali metals, alkaline earth metals and earth metals which decompose upon addition of water, will decompose even when in contact with moisture in the air and produce hydrogen phosphides in view of the resulting hydrolysis. The evolved hydrogen phosphides are combustible in the presence of air, and tend to cause explosions in confined spaces and in any event, are spontaneously combustible especially when they are evolved from crude commercial phosphides. Consequently, they can only be handled with special precautions and despite their high effectiveness for certain purposes, especially pest control, they have only been used to a most limited extent. Furthermore, widespread use has been prevented because of the difficulties encountered in storage and transportation thereof.

In accordance with the invention, it was unexpectedly discovered that the spontaneously combustibility of the hydrogen phosphides evolved from commercial phosphides of the alkali metal, alkaline earth metal or earth metals such as calcium, magnesium and aluminum phosphides can be practically completely suppressed in a relatively simple manner by admixing with such phosphides organic or inorganic materials which are relatively easily thermally decomposed at moderately elevated temperatures. Preferably substances are employed for such admixtures which upon decomposition liberate carbon dioxide and consequently upon intimate admixture with phosphides serve to envelop the individual particles with an inert atmosphere. Advantageously the additional materials are such that noteworthy decomposition thereof occurs already at temperatures below about 60° C. with the evolution of inert decomposition products.

The following substances have been found exceptionally well suited for admixture with the phosphides according to the invention: sodium bicarbonate, ammonium carbonate, ammonium bicarbonate, ammonium carbamate, hartshorn salt, ammonium cyanate, urea, and substituted ureas. All of these substances evolve carbon dioxide upon thermal decomposition and in some instances also evolve ammonia and water. The vaporization of water formed during the decomposition has the further advantage that the heat evolved during the hydrolysis of the phosphides by the moisture in air or other additions of water is carried off in a desirable manner so that the temperature of the phosphide-water system is with certainty maintained below the critical temperature for the ignition of the hydrogen phosphide formed.

The quantity of the easily thermally decomposable substances added can vary within wide limits with respect to the quantity of phosphide depending to a certain extent upon the nature of the added substance. Generally quantities between 10 and 80% and preferably between 33 and 55% have been found suitable. Quantities between 10 and 30% can be employed where it is desirable to have as high a phosphide content as possible without unfavorably affecting the suppression of the spontaneous combustibility.

The addition of such easily decomposable carbon dioxide, ammonium and water evolving substances according to the invention has a favorable effect upon suppression of the spontaneous combustibility of the phosphides in every phase of their preparation and use. It is for example, possible to grind crude phosphides or phosphide mixtures prepared in any desired manner without providing a special protective atmosphere if quantities of hartshorn salt, ammonium bicarbonate or other of the substances named above are added to the raw product in corresponding amounts. As soon as decomposition of the phosphide begins, decomposition of the admixed additional substance also occurs because of the increase in temperature caused by the decomposition of the phosphide whereby as described above the phosphide is enveloped in a protective atmosphere of carbon dioxide which may also contain ammonia, and the vaporization of any water formed maintains the temperature below the critical limit. Consequently, the spontaneous combustibility and explosibility of the hydrogen phosphide formed by the action of moisture upon the phosphide is suppressed with certainty. It is therefore possible to grind the phosphide in a simple manner to the highest degree of fineness, which is of special significance in some fields of application. It has been found particularly advantageous if the phosphides in the compositions according to the invention are ground to an average particle size not above 600$\mu$ (6·10$^{-2}$cm.) and preferably not above 150$\mu$ (1.5·10$^{-2}$cm.).

When the phosphide admixtures according to the invention are packed in moisture-proof containers, for example, water-proof foils, they can be transported under all conditions and have a practically unlimited shelf life. Phosphides in the form of such admixtures can be shipped overseas without hesitation, which in view of the possibility of having water come into contact with phosphide always involved a considerable risk and previously practically precluded shipment of phosphides overseas.

The compositions according to the invention containing finely subdivided phosphides admixed with the thermally easily decomposable materials may be stored and employed in loose powdery form without danger of spontaneous ignition or explosions. However, it is of particular advantage if they are compressed into tablet form and employed in the form of such tablets, as such tablets materially facilitate the dosability of the compositions and improve the stability and handling of the composition.

As the phosphides in the compositions according to the invention are present in a very finely divided state, they react upon access to water, for example, moisture in the air, very quickly and completely so that a maximum yield of hydrogen phosphide is obtained. The complete conversion of the phosphide component into hydrogen phosphide provides the further advantage that the resulting residues are completely non-poisonous and harmless. Even when the compositions according to the invention are employed in compressed tablet form, the phosphide contained therein reacts rapidly and completely as the hydrolysis of the phosphide is accompanied by a large increase in volume of the residue which effects a rapid disintegration of the table which sets free a relatively large surface and permits a thorough and complete reaction between the phosphide and water in the surrounding medium.

The substantial advantages of the compositions according to the invention in which phosphides, preferably, in finely divided form, are admixed with materials which decompose preferably with the formation of carbon dioxide, under the conditions the phosphide content hydrolyses to hydrogen phosphide open up important and large fields of use especially because of their non-dangerous preparation, storage and handling as well as a substantial increase in their activity in evolving hydrogen phosphide. The compositions are especially suitable for pest control, for example, as in soil fumigation and in fumigation of plants as well as fumigation of grain in storage.

Even though the toxicity of hydrogen phosphide against insects and warm blooded animals is greater than that of commonly employed easily volatilized fumigants and the acute toxicity thereof is equal to hydrogen cyanide and the chronic toxicity thereof is some 200 times greater than that of hydrogen cyanide, the previous use of phosphides and hydrogen phosphide as fumigants in pest control was only very limited in view of the dangerous qualities of these substances which rendered it necessary to employ difficult and complicated precautions. The present invention, on the other hand, renders it possible to employ these highly effective substances, in the same or even simpler manner than the previously employed other common toxic agents, the handling of which every pest control operator is entrusted with. A special advantage of the compositions according to the invention whether they are in loose form or compressed into tablets resides in the fact in view of the fine subdivision of the phosphide content the phosphide reacts completely so that after fumigation with such compositions only absolutely non-poisonous residues remain.

The compositions according to the invention are also admirably suited as fertilizers in view of their ease in handling and storability. The phosphide contains phosphorus in a very reactive and easily resorbable form and as the substances admixed with the phosphides according to the invention completely suppress the spontaneous combustion of the hydrogen phosphides evolved upon contact of the compositions with soil moisture, the hydrogen phosphide evolved is uniformly distributed in the soil without loss through ignition. The compositions according to the invention can also supply other nutrients, for example, calcium, magnesium, nitrogen, potassium and the like by suitable selection of the phosphides, for example, calcium and magnesium phosphides and selection of the added material which suppresses spontaneous combustion according to the invention, and contain nitrogen and/or alkali metals in most instances. For fertilizing purposes, the compositions according to the invention can contain only minor proportions of phosphides and mainly consist of the substances which suppress the spontaneous combustibility of the phosphides. Nevertheless the compositions according to the invention containing a more or less large phosphide content are fully safe and highly effective fertilizers as long as their danger of poisoning is taken into account.

The compositions according to the invention also have utility in other fields where suppression of the spontaneous combustibility of hydrogen phosphide is important, for example, in the production of organic phosphorus compounds and other reactions involving hydrogen phosphide.

The following examples will serve to illustrate several modifications of compositions according to the invention.

*Example 1*

Crude aluminum phosphide was mixed with an equal quantity of ammonium carbamate and the mixture ground until it passed without substantial residue through a sieve having 6000 meshes per cm.$^2$ to provide a particle size of less than 150$\mu$. The resulting finely powdered mixture was then compressed to tablets 20 mm. in diameter and 6 mm. thick upon a continuously operating rotary press providing a pressure of 3 kg./cm.$^2$. About 5 to 10 of the resulting tablets sufficed for the fumigation per cubic meter of space or grain to effect a complete kill of grain weevils.

*Example 2*

A 40:60 mixture of calcium phosphide and hartshorn salt was ground and compressed into tablets as in Example 1, but employing a pressure of 6 kg./cm.$^2$. In use, 10 to 15 of these tablets suffice for fumigation of 1 cubic meter.

*Example 3*

20 parts of finely ground aluminum phosphide were mixed with 80 parts of sodium bicarbonate and this mixture pressed into tablets 6 mm. in diameter and 6 mm. thick using a pressure of 5 kg./cm.$^2$. These tablets were especially suited for soil fumigation for control of rodents and the like.

*Example 4*

Calcium phosphide was finely ground and thereafter mixed with an equal part by weight of ammonium carbonate and intimately mixed.

*Example 5*

An aluminum phosphide produced by elementary reaction was mixed with 25% of ammonium carbamate and very finely ground in a high speed rod mill.

All of the compositions of the above examples were not spontaneously combustible upon access to water whether in the loose finely powdered form or in the form of compressed tablets.

I claim:

1. A dry composition of matter comprising a finely divided metal phosphide selected from the group consisting of alkali metal phosphides, alkaline earth metal phosphides and aluminum phosphide in intimate admixture with at least one finely divided substance which decomposes at raised temperature with evolution of carbon dioxide selected from the group consisting of sodium bicarbonate, ammonium carbonate, ammonium bicarbonate, ammonium carbamate, hartshorn salt, ammonium cyanate, urea and substituted ureas, the quantity of said substance which decomposes at elevated temperature being 10 to 80% of said admixture.

2. A dry composition of matter comprising a finely divided metal phosphide selected from the group consisting of alkali metal phosphides, alkaline earth metal phosphides and aluminum phosphide in intimate admixture with 10 to 80% of finely divided ammonium carbonate.

3. A dry composition of matter comprising a finely divided metal phosphide selected from the group consisting of alkali metal phosphides, alkaline earth metal phosphides and aluminum phosphide in intimate admixture with 10 to 80% of finely divided ammonium carbamate.

4. A dry composition of matter comprising a finely divided metal phosphide selected from the group consisting of alkali metal phosphides, alkaline earth metal phosphides and aluminum phosphide in intimate admixture with 10 to 80% of finely divided urea.

5. A composition of matter according to claim 1, in which said finely divided phosphide has an average particle size of less than $6 \cdot 10^{-2}$ cm.

6. A composition of matter according to claim 1, in which said finely divided phosphide has an average particle size of less than $1.5 \cdot 10^{-2}$ cm.

7. A composition according to claim 1, in which said substance which decomposes at elevated temperature comprises 33–55% of said admixture.

References Cited in the file of this patent

UNITED STATES PATENTS 380,189   Clemm _____ Mar. 27, 1888

(Other references on following page)

UNITED STATES PATENTS

| | | |
|---|---|---|
| 977,819 | Mehner | Dec. 6, 1910 |
| 1,599,618 | Koehler | Sept. 14, 1926 |
| 1,893,296 | Lilliendahl | Jan. 3, 1933 |
| 2,117,158 | Freyberg et al. | May 10, 1938 |
| 2,519,045 | Houghton | Aug. 15, 1950 |

OTHER REFERENCES

The Chem. and Action of Insecticides, Shepard; McGraw-Hill, 1951, page 102.

Gazetta Chimica Italiana, Concerning the Structure of the Compounds of Inp, Inas, and Insb, Ando Iandelli, No. 1, vol 71, 1941, pages 58–62.